United States Patent
Hayashi (10) Patent No.: US 8,373,380 B2
(45) Date of Patent: Feb. 12, 2013

(54) DEVICE AND METHOD FOR CONTROLLING ALTERNATING-CURRENT MOTOR

(75) Inventor: Kazuhito Hayashi, Inazawa (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 406 days.

(21) Appl. No.: 12/677,432

(22) PCT Filed: Sep. 29, 2008

(86) PCT No.: PCT/JP2008/067652
§ 371 (c)(1),
(2), (4) Date: Mar. 10, 2010

(87) PCT Pub. No.: WO2009/047997
PCT Pub. Date: Apr. 16, 2009

(65) Prior Publication Data
US 2010/0194330 A1    Aug. 5, 2010

(30) Foreign Application Priority Data
Oct. 9, 2007    (JP) .................................. 2007-263422

(51) Int. Cl.
*H02P 23/00*    (2006.01)
(52) U.S. Cl. ......... 318/799; 318/727; 318/767; 318/798
(58) Field of Classification Search .................. 318/727, 318/767, 798, 799
See application file for complete search history.

(56) References Cited

U.S. PATENT DOCUMENTS

| | | | | |
|---|---|---|---|---|
| 8,148,927 B2* | 4/2012 | Ono et al. | ................. | 318/400.02 |
| 2002/0180402 A1* | 12/2002 | Koide et al. | .................... | 318/727 |
| 2008/0218111 A1* | 9/2008 | Okamura | ...................... | 318/453 |
| 2011/0181231 A1* | 7/2011 | Ito et al. | ......................... | 318/801 |
| 2011/0248663 A1* | 10/2011 | Yamakawa et al. | ........... | 318/805 |

FOREIGN PATENT DOCUMENTS

| | | |
|---|---|---|
| JP | A-2001-298992 | 10/2001 |
| JP | A-2004-23920 | 1/2004 |
| JP | A-2006-14426 | 1/2006 |
| JP | A-2006-74951 | 3/2006 |
| JP | A-2006-81322 | 3/2006 |
| JP | A-2006-115605 | 4/2006 |

OTHER PUBLICATIONS

Dec. 2, 2008 Search Report issued in International Patent Application No. PCT/JP2008/067652 (with translations).

\* cited by examiner

*Primary Examiner* — Walter Benson
*Assistant Examiner* — Kawing Chan
(74) *Attorney, Agent, or Firm* — Oliff & Berridge, PLC (57) ABSTRACT

A device for controlling an alternating-current motor includes a resolver for detecting a rotational position of an alternating-current motor; and a rectangular wave voltage control unit for performing control based on an output of the resolver to provide a rectangular wave voltage to each phase of the alternating-current motor. The control unit causes an amount of change Δθ in a voltage phase of the rectangular wave voltage of each phase from a switching reference phase of each phase to increase or decrease equally for each switching in one cycle of an electrical angle determined based on the output of the resolver. In this way, a device for controlling an alternating-current motor is provided to restrain occurrence of an offset current upon rectangular wave voltage control.

4 Claims, 7 Drawing Sheets

| | PWM CONTROL METHOD | | RECTANGULAR WAVE VOLTAGE CONTROL METHOD |
|---|---|---|---|
| CONTROL | SINUSOIDAL WAVE PWM | OVERMODULATION PWM | RECTANGULAR WAVE (ONE PULSE) |
| WAVEFORM OF OUTPUT VOLTAGE OF INVERTER | FUNDAMENTAL WAVE COMPONENT | FUNDAMENTAL WAVE COMPONENT | FUNDAMENTAL WAVE COMPONENT |
| MODULATION FACTOR | 0~0.61 | 0.61~0.78 | 0.78 |
| FEATURE | REDUCED FLUCTUATION OF TORQUE | IMPROVED OUTPUT IN MIDDLE SPEED REGION | IMPROVED OUTPUT IN HIGH SPEED REGION |

DEVICE AND METHOD FOR CONTROLLING ALTERNATING-CURRENT MOTOR

TECHNICAL FIELD

The present invention relates to a device and a method for controlling an alternating-current motor, in particular, to a device and a method for controlling an alternating-current motor using rectangular wave control.

BACKGROUND ART

In controlling an alternating-current motor, a rectangular wave voltage driving method is employed in operation regions in which an output voltage is restrained by a direct-current power source voltage if a pulse width modulation (PWM) driving method is employed.

Regarding such rectangular wave control, Japanese Patent Laying-Open No. 2006-115605 (Patent Document 1) discloses a technique for detecting an amount of imbalance between ON/OFF widths of a rectangular wave voltage provided to each phase, in order to correct a timing at which a pattern of voltage waveform thereof is switched. This achieves suppression of the imbalance, which results from an error of a rotor positional sensor, between the ON/OFF widths of the rectangular wave voltage, thus allowing for a reduced offset current.

Patent Document 1: Japanese Patent Laying-Open No, 2006-115605
Patent Document 2: Japanese Patent Laying-Open No. 2006-74951
Patent Document 3: Japanese Patent Laying-Open No. 2006-14426
Patent Document 4: Japanese Patent Laying-Open No. 2001-298992
Patent Document 5: Japanese Patent Laying-Open No. 2004-23920

DISCLOSURE OF THE INVENTION

Problems to be Solved by the Invention

Although Japanese Patent Laying-Open No. 2006-115605 allows for the reduction of the offset current resulting from the error of the rotor positional sensor as such, this is not only the cause for occurrence of an offset current. For example, while controlling torque by altering voltage phases, the ON/OFF widths of the rectangular wave voltage are not fixed temporarily, resulting in occurrence of an offset current.

An object of the present invention is to provide a device for controlling an alternating-current motor, whereby occurrence of an offset current is restrained during rectangular wave voltage control.

SUMMARY OF THE INVENTION

In summary, the present invention provides a device for controlling an alternating-current motor, the device including: a sensor for detecting a rotational position of the alternating-current motor; and a control unit for performing control based on an output of the sensor to provide a rectangular wave voltage to each phase of the alternating-current motor. The control unit causes an amount of change in a voltage phase of the rectangular wave voltage of each phase from a switching reference phase of each phase to increase/decrease such that the amount of change is equivalent at each switching in one cycle of electrical angle determined from the output of the sensor.

It is preferable that the control unit calculate a total amount of change in the voltage phase of the rectangular wave voltage for the one cycle of electrical angle, and divides the total amount by the number of times the switching is performed in the one cycle, so as to set an amount of increase/decrease of the amount of change in the voltage phase of the rectangular wave voltage of each phase.

It is more preferable that the control unit calculate the total amount of change in the voltage phase of the rectangular wave voltage based on a torque command indicating an amount of torque to be generated by the alternating-current motor.

It is more preferable that the control unit set a difference in phase at an n-th switching from the switching reference phase of each phase in the one cycle, to a value n times larger than the amount of increase/decrease.

According to another aspect, the present invention provides a method for controlling an alternating-current motor, the method including the steps of: determining whether to cause transition of a voltage value of a rectangular wave voltage of each phase of the alternating-current motor, based on an output of a sensor for detecting a rotational position of the alternating-current motor; determining an amount of increase/decrease of an amount of change in a voltage phase of the rectangular wave voltage of each phase from a switching reference phase of each phase such that the amount of change is equivalent at each switching in one cycle of electrical angle determined from the output of the sensor; and performing a switching operation to cause transition of the voltage value of the rectangular wave voltage of each phase, based on the switching reference phase and the amount of change.

It is preferable that the method for controlling an alternating-current motor further include the steps of: calculating a total amount of change in the voltage phase of the rectangular wave voltage for the one cycle of electrical angle; and dividing the total amount by the number of times the switching is performed in the one cycle, so as to set the amount of increase/decrease of the amount of change in the voltage phase of the rectangular wave voltage of each phase.

It is more preferable that the step of determining the amount of increase/decrease of the amount of change set a difference in phase at an n-th switching from the switching reference phase of each phase in the one cycle, to a value n times larger than the amount of increase/decrease.

EFFECTS OF THE INVENTION

According to the present invention, occurrence of an offset current can be restrained and overcurrent and abnormal vibrations are prevented upon performing rectangular wave voltage control.

DESCRIPTION OF THE REFERENCE SIGNS

5: negative electrode line; 6: positive electrode line; 7: positive electrode line; 10#: direct-current voltage generating unit; 10: voltage sensor; 13: voltage sensor; 12: converter; 14: inverter; 15: U-phase arm; 16: V-phase arm; 17: W-phase arm; 24: current sensor; 25: resolver; 30: control device; 100: motor driving system; 200: PWM control unit; 210: current command generating unit; 220, 250: coordinate conversion unit; 240, 430: PI calculating unit; 260: PWM signal generating unit; 270: control mode determining unit; 400: rectangular wave voltage control unit; 420: torque estimation unit; 432: phase limiter; 440: rectangular wave generating unit; 450: signal generating unit; B: direct-current power source; C0, C1: smoothing capacitor; D1-D8: diode; L1: reactor; M1: alternating-current motor; Q1-Q8: switching element; SR1, SR2: system relay.

DETAILED DESCRIPTION OF THE INVENTION

An embodiment of the present invention will be described in detail below with reference to figures. It should be noted that the same or equivalent portions are given the same reference characters and explanation therefor will not be repeated.

Figure 1:
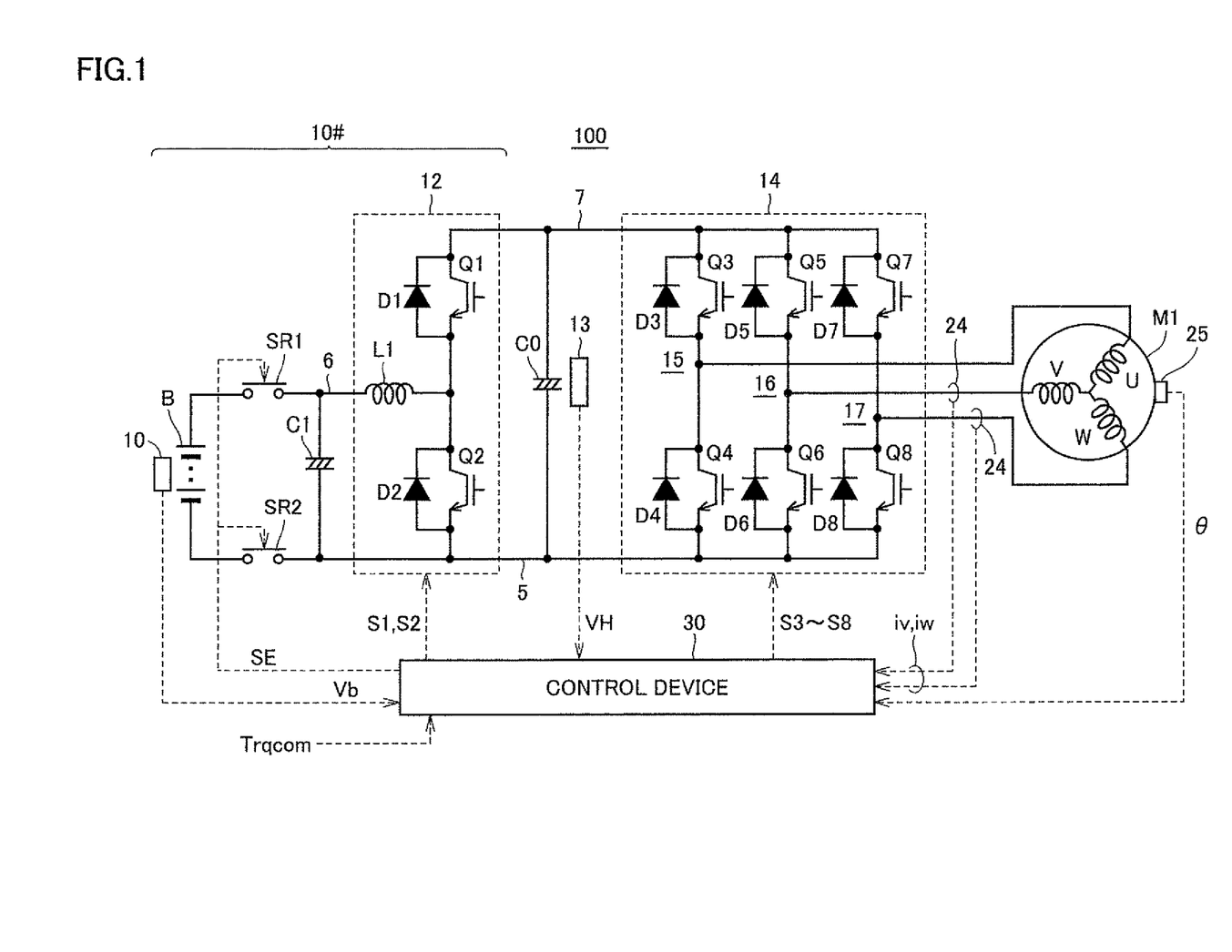
FIG. 1 is a diagram of an entire configuration of a motor driving system according to an embodiment of the present invention.

FIG. 1 is a diagram of an entire configuration of a motor driving system according to an embodiment of the present invention.

Referring to FIG. 1, motor driving system 100 according to the embodiment of the present invention includes a direct-current voltage generating unit 10#, a smoothing capacitor C0, an inverter 14, and an alternating-current motor M1.

Alternating-current motor M1 is, for example, a driving motor for generating torque to drive a driving wheel of a hybrid vehicle or an electric vehicle. Alternatively, alternating-current motor M1 may be configured to have a function of a power generator driven by an engine, and may be configured to have functions of both a motor and a power generator. Further, alternating-current motor M1 may operate as a motor for the engine and may be incorporated in a hybrid vehicle as a component capable of starting the engine, for example.

Direct-current voltage generating unit 10# includes a direct-current power source B configured to be chargeable, system relays SR1, SR2, a smoothing capacitor C1, and a step-up/step-down converter 12.

Direct-current power source B is configured to contain a secondary battery such as a nickel hydrogen battery or a lithium ion battery. Alternatively, direct-current power source B may be constituted by a power storage device such as an electric double layer capacitor. Direct-current power source B outputs a direct-current voltage Vb, which is detected by a voltage sensor 10. Voltage sensor 10 sends a control device 30 direct-current voltage Vb thus detected.

System relay SR1 is connected between the positive electrode terminal of direct-current power source B and a positive electrode line 6, whereas system relay SR2 is connected between the negative electrode terminal of direct-current power source B and a negative electrode line 5. Each of system relays SR1, SR2 is turned on/off in response to a signal SE from control device 30. More specifically, each of system relays SR1, SR2 is turned on in response to signal SE of the H (logic high) level supplied from control device 30, and is turned off in response to signal SE of the L (logic low) level supplied therefrom. Smoothing capacitor C1 is connected between positive electrode line 6 and negative electrode line 5.

Step-up/step-down converter 12 includes a reactor L1, power semiconductor switching elements Q1, Q2, and diodes D1, D2.

Power semiconductor switching elements Q1 and Q2 are connected between a positive electrode line 7 and negative electrode line 5 in series. Turning on/off power semiconductor switching elements Q1 and Q2 is controlled by means of switching control signals S1 and S2 supplied from control device 30.

In the embodiment of the present invention, an IGBT (Insulated Gate Bipolar Transistor), a power MOS (Metal Oxide Semiconductor) transistor, a power bipolar transistor, or the like can be used as each of the power semiconductor switching elements (hereinafter, each simply referred to as "switching element"). Anti-parallel diodes D1, D2 are provided for switching elements Q1, Q2 respectively.

Reactor L1 is connected between a connection node of switching elements Q1, Q2 and positive electrode line 6. Further, smoothing capacitor C0 is connected between positive electrode line 7 and negative electrode line 5.

Inverter 14 includes a U-phase arm 15, a V-phase arm 16, and a W-phase arm 17, which are provided in parallel between positive electrode line 7 and negative electrode line 5. Each of the phase arms includes switching elements connected between positive electrode line 7 and negative electrode line 5 in series. For example, U-phase arm 15 includes switching elements Q3, Q4. V-phase arm 16 includes switching elements Q5, Q6. W-phase arm 17 includes switching elements Q7, Q8. Further, anti-parallel diodes D3-D8 are connected to switching elements Q3-Q8 respectively. Turning on/off switching elements Q3-Q8 is controlled by means of switching control signals S3-S8 supplied from control device 30.

The phase arms have intermediate points respectively connected to phase ends of corresponding phase coils of alternating-current motor M1. Typically, alternating-current motor M1 is a three-phase permanent magnet motor, and is configured to have three coils of the U, V, W phases, each having one end connected to a neutral point commonly. Each of the phase coils has the other end connected to the intermediate point of the switching elements of each of phase arms 15-17.

In a step-up operation, step-up/step-down converter 12 steps up a direct-current voltage Vb supplied from direct-current power source B to obtain a direct-current voltage VH, which corresponds to a voltage input to inverter 14 and is hereinafter also referred to as "system voltage", and supplies it to inverter 14. More specifically, in response to switching control signals S1, S2 from control device 30, the on period of switching element Q1 and the on period of switching element Q2 are provided to come alternately. A step-up ratio is in accordance with the ratio of these on periods.

On the other hand, in a step-down operation, step-up/step-down converter 12 steps down direct-current voltage VH (system voltage) supplied from inverter 14 via smoothing capacitor C0 to charge direct-current power source B. More specifically, in response to switching control signals S1, S2 from control device 30, a period during which only switching element Q1 is on, and a period during which both switching elements Q1, Q2 are off are provided to come alternately. A step-down ratio is in accordance with the duty ratio of the foregoing on period. Instead of the period during which both switching elements Q1, Q2 are off, a period during which only switching element Q2 is turned on may be provided to correspond to the on period of anti-parallel diode D2. In this case, switching elements Q1, Q2 complementarily becomes on and off repeatedly in principle.

Smoothing capacitor C0 smoothes the direct-current voltage supplied from step-up/step-down converter 12, and supplies the smoothed direct-current voltage to inverter 14. A voltage sensor 13 detects the voltage across smoothing capacitor C0, i.e., the system voltage, and sends detected value VH thereof to control device 30.

In response to switching control signals S3-S8 from control device 30, inverter 14 causes switching of switching elements Q3-Q8. Inverter 14 is supplied with direct-current voltage VH from smoothing capacitor C0.

When a torque command value for alternating-current motor M1 has a positive value (Trqcom>0), inverter 14 converts the direct-current voltage into an alternating-current voltage by means of switching of switching elements Q3-Q8 and drives alternating-current motor M1 to output a positive torque.

Meanwhile, when the torque command value for alternating-current motor M1 has a value of 0 (Trqcom=0), inverter 14 converts the direct-current voltage into an alternating-current voltage by means of switching of switching elements Q3-Q8 and drives alternating-current motor M1 to obtain a torque of 0.

By controlling in this way, alternating-current motor M1 is driven to generate a torque of 0 or of a positive value as designated by torque command value Trqcom.

Furthermore, upon regenerative braking of a hybrid vehicle or electric vehicle having motor driving system 100 mounted thereon, torque command value Trqcom of alternating-current motor M1 is set to a negative value (Trqcom<0). In this case, inverter 14 converts, by means of switching of switching elements Q3-Q8, an alternating-current voltage generated by alternating-current motor M1 into direct-current voltage VH, and supplies direct-current voltage VH (system voltage) thus converted, to step-up/step-down converter 12 via smoothing capacitor C0.

It should be noted that the term "regenerative braking" as described herein includes: braking involving regenerative power generation resulting from manipulation of the foot brake pedal by a driver who drives the hybrid vehicle or electric vehicle; and vehicular speed reduction (or stop of acceleration) involving regenerative power generation achieved by easing off the accelerator pedal during traveling without manipulating the foot brake pedal.

Current sensors 24 detect motor currents flowing in alternating-current motor M1, and notify control device 30 of the detected motor currents. The sum of the instantaneous values of three phase currents iu, iv, iw is zero. Hence, it is sufficient to dispose current sensors 24 to detect motor currents for two phases (for example, V-phase current iv and W-phase current iw) as shown in FIG. 1.

A rotational angle sensor (resolver 25) detects a rotor rotational angle θ of alternating-current motor M1, and notifies control device 30 of rotational angle θ thus detected. Control device 30 calculates the rotation rate (rotation speed) of alternating-current motor M1 based on rotational angle θ.

Based on torque command value Trqcom received from an externally provided electronic control unit (host ECU not shown), battery voltage Vb detected by voltage sensor 10, system voltage VH detected by voltage sensor 13, motor currents iv, iw detected by current sensors 24, and rotational angle θ detected by resolver 25, control device 30 controls operations of step-up/step-down converter 12 and inverter 14 so that alternating-current motor M1 outputs a torque according to torque command value Trqcom.

Control device 30 generates switching control signals S1-S8 to control step-up/step-down converter 12 and inverter 14 in the manner described above, and sends them to step-up/step-down converter 12 and inverter 14.

In the step-up operation of step-up/step-down converter 12, control device 30 controls output current VH of smoothing capacitor C0 through feedback to generate switching control signals S1, S2 so that output current VH has a value equal to the voltage command value.

Further, when control device 30 receives from the external ECU a signal RGE indicating that the hybrid vehicle or electric vehicle has entered the regenerative braking mode, control device 30 generates switching control signals S3-S8 to convert the alternating-current voltage generated by alternating-current motor M1 into a direct-current voltage, and outputs them to inverter 14. Accordingly, inverter 14 converts the alternating-current voltage generated by alternating-current motor M1 into the direct-current voltage and supplies it to step-up/step-down converter 12.

Furthermore, when control device 30 receives from the external ECU signal RGE indicating that the hybrid vehicle or electric vehicle has entered the regenerative braking mode, control device 30 generates switching control signals S1, S2 to step down the direct-current voltage supplied from inverter 14, and outputs them to step-up/step-down converter 12. Accordingly, the alternating-current voltage generated by alternating-current motor M1 is converted into the direct-current voltage, is stepped down, and is supplied to direct-current power source B.

Further, control device 30 generates signal SE for turning on/off system relays SR1, SR2 and outputs it to system relays SR1, SR2.

Next, electric power conversion performed by inverter 14 under control of control device 30 will be described in detail.

Figure 2:
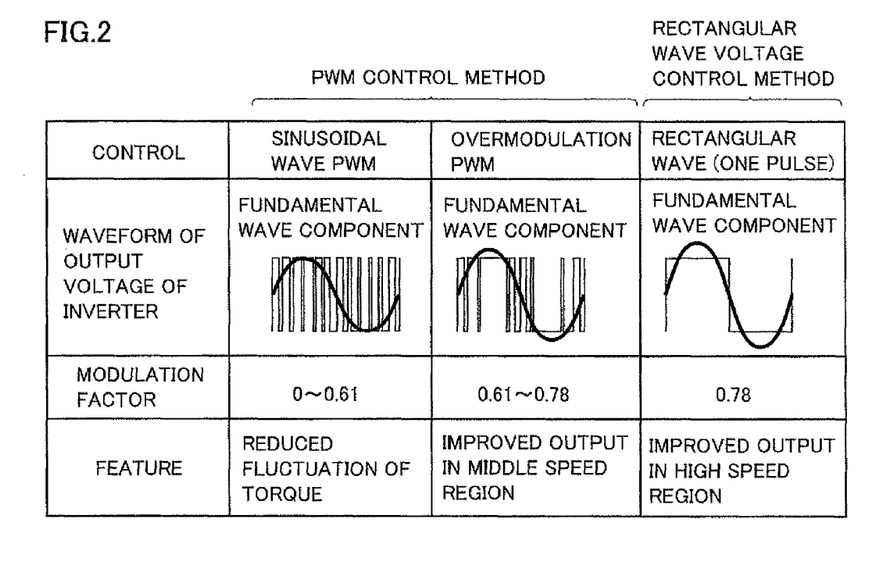
FIG. 2 is an explanatory diagram of control methods used in the motor driving system according to the embodiment of the present invention.

FIG. 2 illustrates control methods employed in the motor driving system according to the embodiment of the present invention.

As shown in FIG. 2, motor driving system 100 according to the embodiment of the present invention employs three control modes, which are to be changed over for voltage conversion in inverter 14. Specifically, the three control modes are a sinusoidal wave PWM control mode, an overmodulation PWM control mode, and a rectangular wave voltage control mode.

The sinusoidal wave PWM control is utilized as a general PWM control method, and is to control the switching elements of each of the phase arms to become on/off in accordance with a comparison in voltage between a sinusoidal-wave voltage command value and a carrier wave (typically, a triangular wave). As a result, for a set of the high level period corresponding to the on period of each of the upper arm elements and the low level period corresponding to the on period of each of the lower arm elements, a duty ratio is controlled to cause a fundamental wave component thereof to be a sinusoidal wave during a fixed period of time. As known well, the sinusoidal wave PWM control is only capable of increasing the amplitude of the fundamental wave component up to 0.61 times as large as that of the voltage input to the inverter.

On the other hand, in the rectangular wave voltage control, the alternating-current motor is fed with one pulse of a rectangular wave in which the ratio of the high level period and the low level period is 1:1. Such a rectangular wave is obtained by maintaining the PWM duty at its maximal value during the above-described fixed period of time. This increases the modulation factor up to 0.78.

The overmodulation PWM control is to perform PWM control similar to the sinusoidal wave PWM control, with the fundamental wave component being distorted to reduce the amplitude of the carrier wave. Such distortion of the fundamental wave component results in a modulation factor increased up to a range of 0.61-0.78. In the present embodiment, the sinusoidal wave PWM control, which is a normal PWM control method, and the overmodulation PWM control are each classified as a "PWM control method".

As the rotation speed and/or the output torque are increased, alternating-current motor M1 has an increased induced voltage and requires a higher voltage. The voltage stepped up by converter 12, i.e., system voltage VH, needs to be set higher than this motor-required voltage (induced voltage). Meanwhile, the voltage stepped up by converter 12, i.e., the system voltage, has a limit value (VH maximal voltage).

Hence, in a region where the motor-required voltage (induced voltage) is lower than the maximal value of the system voltage (VH maximal voltage), a PWM control method, employing the sinusoidal wave PWM control or the overmodulation PWM control, is applied to control the motor currents according to vector control. Accordingly, output torque is controlled to be equal to torque command value Trqcom.

Meanwhile, when the motor-required voltage (induced voltage) reaches the maximal value of the system voltage (VH maximal voltage), the rectangular wave voltage control method, one type of weak field control, is applied while maintaining system voltage VH. During the rectangular wave voltage control, the amplitude of the fundamental wave component is fixed and the voltage phase of the rectangular wave pulse is therefore controlled based on a deviation between an actual torque value found by calculation for electric power and the torque command value. In this way, torque is controlled.

Figure 3:
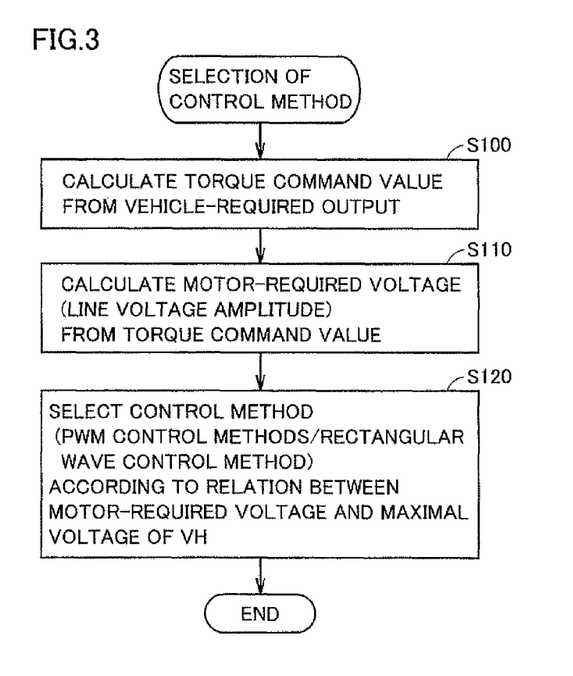
FIG. 3 is a flowchart illustrating how to select a control method.

FIG. 3 is a flowchart illustrating how to select a control method.

As shown in the flowchart of FIG. 3, the host ECU (not shown) calculates torque command value Trqcom for alternating-current motor M1 based on an output required by the vehicle according to an accelerator pedal position or the like (step S100). In response to the calculation, control device 30 calculates the motor-required voltage (induced voltage) from torque command value Trqcom of alternating-current motor M1 and the rotation speed based on a map or the like set in advance (step S110). In accordance with the relation between the motor-required voltage and the maximal value of the system voltage (VH maximal voltage), control device 30 determines whether the rectangular wave voltage control method or a PWM control method (the sinusoidal wave PWM control method/overmodulation PWM control method) is applied to control the motor (step S120). If a PWM control method is applied, which one of the sinusoidal wave PWM control method and the overmodulation PWM control method should be used is determined in accordance with the modulation factor range of the voltage command value according to the vector control. In accordance with the control flow as well as a driving condition of alternating-current motor M1, an appropriate one is selected from the plurality of control methods shown in FIG. 2.

Figure 4:
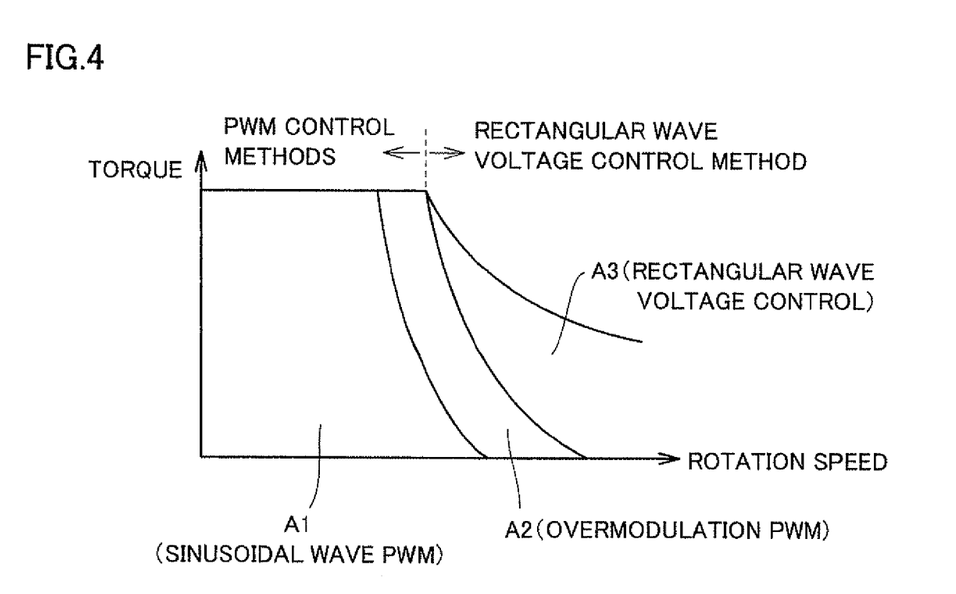
FIG. 4 illustrates changeover between the control methods performed corresponding to a condition of a motor.

FIG. 4 illustrates changeover of the control methods according to motor conditions.

As shown in FIG. 4, as a result of the selection from the control methods, the sinusoidal wave PWM control is employed for a low rotation speed region A1 to reduce fluctuations of torque, the overmodulation PWM control is employed for a middle rotation speed region A2, and the rectangular wave voltage control is employed for a high rotation speed region A3. Particularly, by applying the overmodulation PWM control and the rectangular wave voltage control, an improved output of alternating-current motor M1 is realized. As such, which one of the control modes shown in FIG. 2 is used is determined in consideration of a range of an implementable modulation factor.

Figure 5:
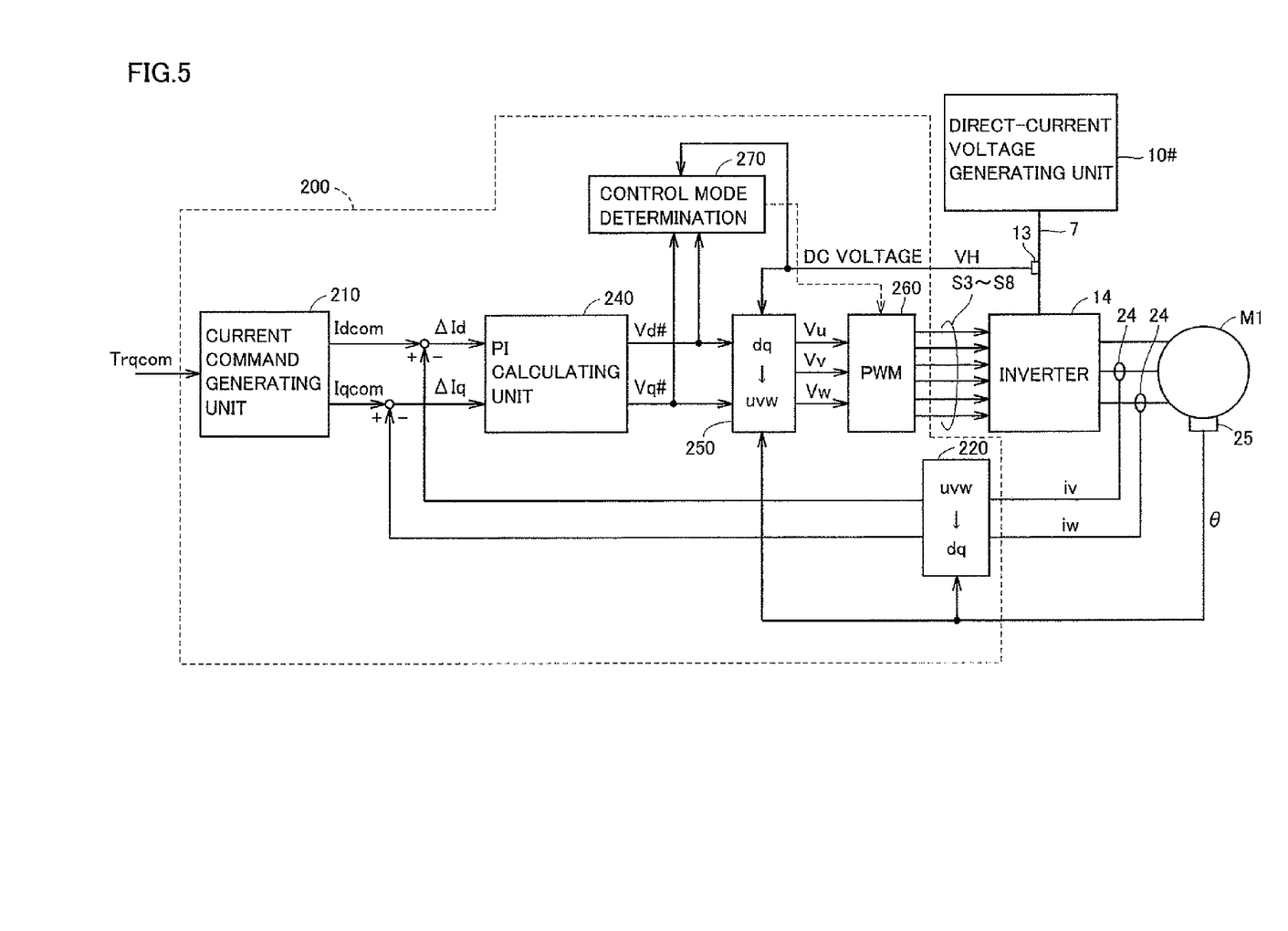
FIG. 5 is a control block diagram of PWM control performed by a control device 30.

FIG. 5 is a control block diagram of the PWM control performed by control device 30.

As shown in FIG. 5, a PWM control unit 200 includes a current command generating unit 210, coordinate conversion units 220, 250, a PI calculating unit 240, a PWM signal generating unit 260, and a control mode determining unit 270.

Current command generating unit 210 generates, in accordance with a table or the like prepared in advance, a d-axis current command value Idcom and a q-axis current command value Iqcom both obtained according to torque command value Trqcom.

Coordinate conversion unit 220 employs a rotational angle θ of alternating-current motor M1 detected by resolver 25 for coordinate conversion (three phases→two phases), to calculate d-axis current Id and q-axis current Iq based on V-phase current iv and W-phase current iv detected by current sensors 24.

PI calculating unit 240 receives a deviation ΔId from the command value of the d-axis current (ΔId=Idcom−Id) and a deviation ΔIq from the command value of the q-axis current (ΔIq=Iqcom−Iq). PI calculating unit 240 performs PI calculation for d-axis current deviation ΔId and q-axis current deviation ΔIq using a predetermined gain to find a control deviation, and generates a d-axis voltage command value Vd# and a q-axis voltage command value Vq# according to the control deviation.

Coordinate conversion unit 250 employs rotational angle θ of alternating-current motor M1 for coordinate conversion (two phases→three phases) to convert d-axis voltage command value Vd# and q-axis voltage command value Vq# into U-phase, V-phase, and W-phase voltage command values Vu, Vv, Vw. Note that system voltage VH is also reflected in the conversion from d-axis and q-axis voltage command values Vd#, Vq# to phase voltage command values Vu, Vv, Vw.

When a PWM control method (the sinusoidal wave PWM control method/overmodulation PWM control method) is selected according to the flowchart shown in FIG. 3, control mode determining unit 270 selects one of the sinusoidal wave PWM control method and the overmodulation PWM control method in accordance with modulation factor calculation described below.

Control mode determining unit 270 employs d-axis voltage command value Vd# and q-axis voltage command value Vq# generated by PI calculating unit 240, to calculate a line voltage amplitude Vamp in accordance with the following expressions (1) and (2):

$$Vamp = |Vd\#| \cdot \cos\phi + |Vq\#| \cdot \sin\phi \quad (1)$$

$$\tan\phi = Vq\#/Vd\# \quad (2)$$

Further, control mode determining unit 270 calculates a modulation factor Kmd, which represents a ratio of line voltage amplitude Vamp found through the foregoing calculation to system voltage VH, in accordance with the following expression (3):

$$Kmd = Vamp/VH\# \qquad (3)$$

Control mode determining unit 270 selects one of the sinusoidal wave PWM control and the overmodulation PWM control in accordance with modulation factor Kmd found through the above calculation. As described above, the selection of a control method by control mode determining unit 270 will be reflected in changeover of carrier waves in PWM signal generating unit 260. Specifically, for the overmodulation PWM control method, a carrier wave used for PWM modulation in PWM signal generating unit 260 is changed over from a general one used for the sinusoidal wave PWM control method.

Alternatively, if modulation factor Kmd found through expression (3) exceeds a range implementable by the PWM control methods, control mode determining unit 270 may provide an output to the host ECU (not shown) to urge changeover to the rectangular wave voltage control method.

PWM signal generating unit 260 generates switching control signals S3-S8 shown in FIG. 1 based on comparison between each of phase voltage command values Vu, Vv, Vw and the predetermined carrier wave. In accordance with switching control signal S3-S8 generated by PWM control unit 200, switching of inverter 14 is controlled, thereby applying to the motor an alternating-current voltage for outputting torque according to torque command value Trqcom input to current command generating unit 210.

In this way, a closed loop is formed to adjust the motor currents to the current command values (Idcom, Iqcom) according to torque command value Trqcom, thus controlling the output torque of alternating-current motor M1 in accordance with torque command value Trgcom.

Figure 6:
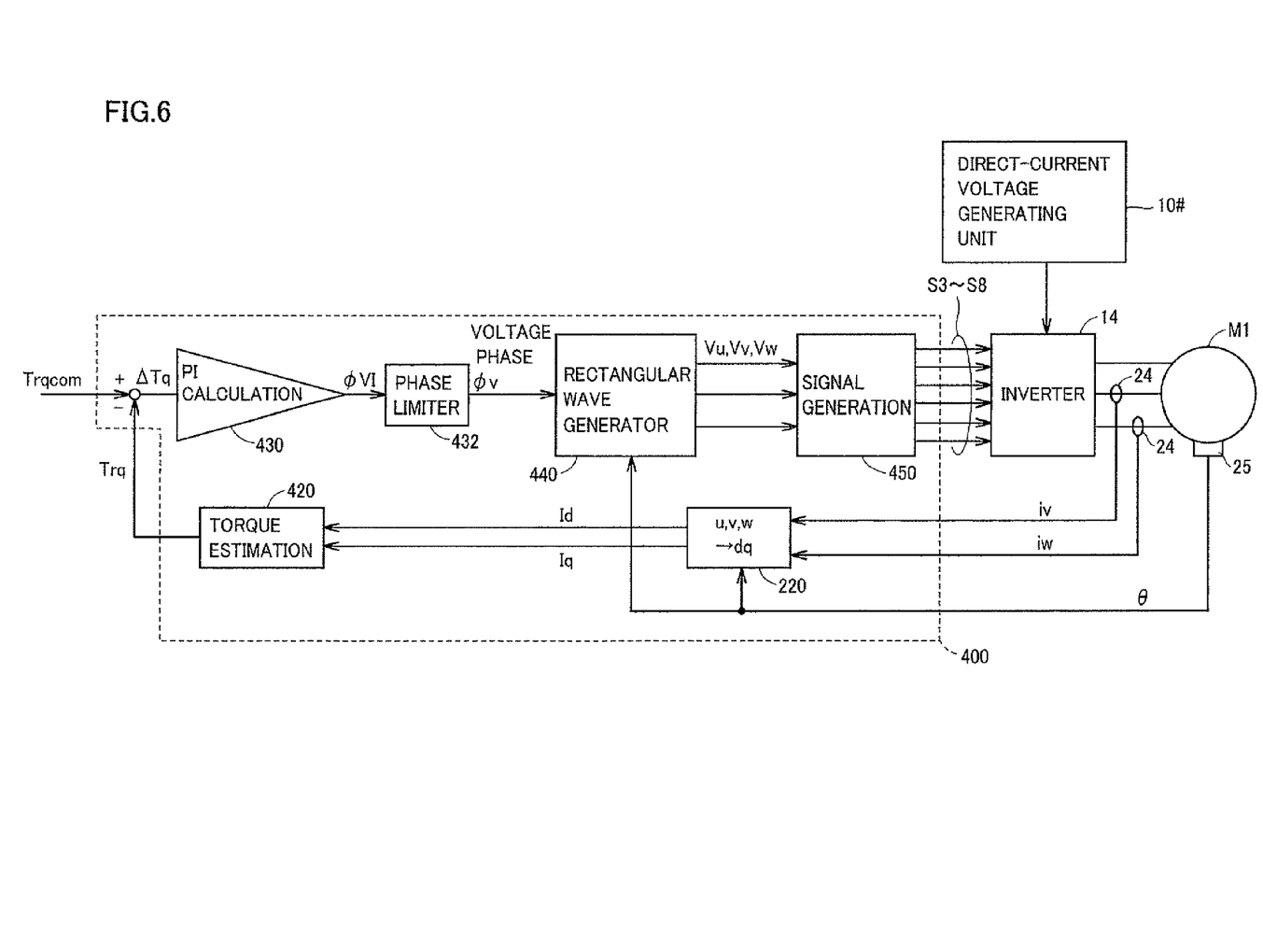
FIG. 6 is a control block diagram of rectangular wave voltage control performed by control device 30.

FIG. 6 is a control block diagram showing rectangular wave voltage control performed by control device 30.

Referring to FIG. 6, rectangular wave voltage control unit 400 includes a coordinate conversion unit 220 similar to that in the PWM control methods, a torque estimation unit 420, a PI calculating unit 430, a phase limiter 432, a rectangular wave generating unit 440, and a signal generating unit 450.

As with the PWM control methods, coordinate conversion units 220 performs coordinate conversion of respective phase currents, found from V-phase current iv and W-phase current iw detected by current sensors 24, into d-axis current It and q-axis current Iq.

Torque estimation unit 420 uses d-axis current Id and q-axis current Iq found by coordinate conversion units 220, to estimate the output torque of alternating-current motor M1. Torque estimation unit 420 is constituted by, for example, a torque calculation map for outputting a torque estimation value Trq with d-axis current Id and q-axis current Iq being arguments.

PI calculating unit 430 receives a deviation ΔTrq of torque estimation value Trq from torque command value Trqcom (ΔTrq=Trqcom−Trq). PI calculating unit 430 performs PI calculation using a predetermined gain for torque deviation ΔTrq so as to find a control deviation, and sets a phase φv of the rectangular wave voltage in accordance with the control deviation thus found. Specifically, when a positive torque is generated (Trqcom>0) and the torque is insufficient, it advances the voltage phase whereas when a positive torque is generated (Trqcom>0) and the torque is excessive, it delays the voltage phase. When a negative torque is generated (Trqcom<0) and the torque is insufficient, it delays the voltage phase whereas when a negative torque is generated (Trqcom<0) and the torque is excessive, it advances the voltage phase.

Phase limiter 432 imposes a predetermined restriction on a phase φVI of the output from PI calculating unit 430. Accordingly, the output from the phase limiter has a voltage phase Φv, and is provided to rectangular wave generating units 440.

In accordance with voltage phase φv, rectangular wave generating unit 440 generates phase voltage command values (rectangular wave pulses) Vu, Vv, Vw. In accordance with phase voltage command values Vu, Vv, Vw, signal generating unit 450 generates switching control signals S3-S8. In accordance with switching control signals S3-S8, inverter 14 operates to switch, thereby applying to the motor the rectangular wave pulses according to voltage phase φv as the respective phase voltages thereof.

In rectangular wave voltage control unit 400 shown in FIG. 6, torque estimation value Trq used for torque feedback control is calculated only based on the outputs of current sensor 24 and resolver 25, as with the PWM control shown in FIG. 5. Thus, even when a control method is changed over between the PWM control and the rectangular wave voltage control, there occurs no difference in the alternating-current motor's state quantity used to control the motor (sensor detection quantity).

Reduction of Offset Current in Rectangular Wave Voltage Control

In the rectangular wave voltage control, torque is controlled by manipulating a voltage phase of a rectangular wave relative to a rotational angle of the rotor. For example, torque can be increased according to an amount by which a voltage phase is advanced relative to an electrical angle in a predetermined range of an amount of phase manipulation. Normally, in the case of a three-phase motor, timings at which voltage phases can be manipulated come 6 times in one cycle of electrical angle.

If various manipulations on the voltage phases are permitted at all the six timings in one cycle of electrical angle, a different voltage phase manipulation may be performed at every timing. This causes a difference in the rise and fall widths of the three-phase rectangular voltage, resulting in occurrence of an offset current. The offset current may cause overcurrent or vibrations of the vehicle. Now, the manipulations on the voltage phase will be described.

Figure 7:
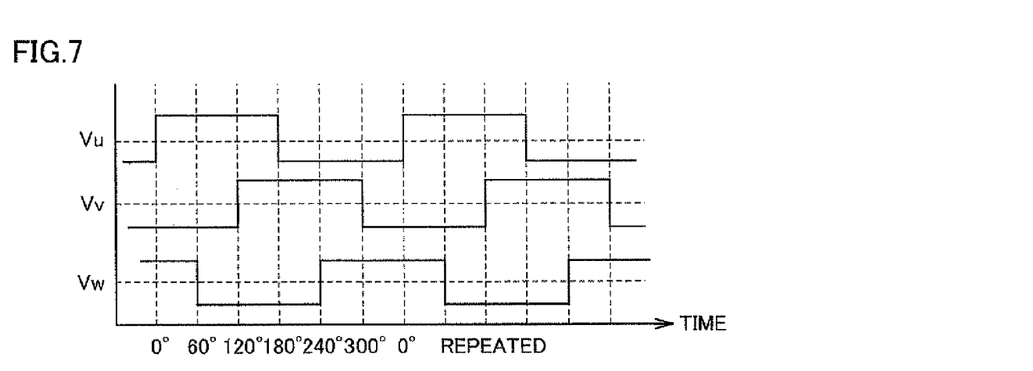
FIG. 7 is a waveform diagram showing a voltage waveform of each phase when no voltage phase is manipulated during a stationary state in the rectangular wave control.

FIG. 7 is a waveform diagram showing voltage waveforms of the phases in the case where no voltage phase is manipulated during the stationary state in the rectangular wave control.

In FIG. 7, the horizontal axis indicates time but is described with electrical angles corresponding to time change. An electrical angle is determined based on a rotational position of the rotor.

In the case of the three-phase motor during the stationary state in the rectangular wave control, U-phase voltage Vu, V-phase voltage Vv, and W-phase voltage Vw are shifted by 120°. The waveforms equally have rise and fall widths of 180° in the electrical angle. Since the on and off widths of the waveforms are equal to one another, no offset current occurs in this state.

In the rectangular wave control, a voltage phase can be changed at a timing at which transition is made from the on state to the off state or from the off state to the on state in each waveform of the phases. Hence, in the waveforms of FIG. 7, timings at which voltage phases can be changed come every 60° in electrical angle.

Figure 8:
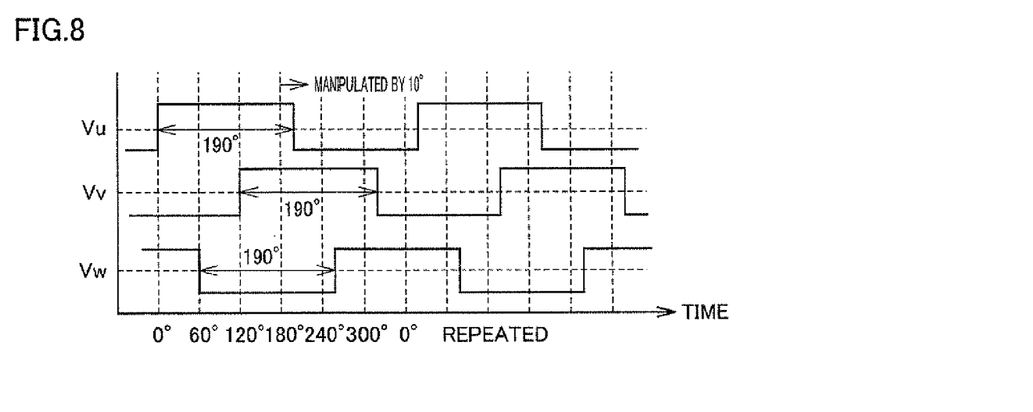
FIG. 8 illustrates an example of occurrence of an offset current due to manipulation of voltage phases.

FIG. 8 illustrates an exemplary case of occurrence of an offset current occurring due to a voltage phase manipulation.

Referring to FIG. 8, this exemplary case is to change a timing at which the U phase voltage transitions at an electrical angle of 180°. In this exemplary case, the voltage phase is manipulated by 10°. After the electrical angle of 180°, each waveform of the U phase, the V phase, and the W phase is shifted backward by an electrical angle of 10°. Accordingly, as indicated by arrows in FIG. 8, some on widths are 190° in electrical angle. Since these on periods are different in width from the off periods coming just before and just after the on periods and having a width of 180°, a balance between the on periods and the off periods in the voltage is temporarily lost, resulting in occurrence of an offset current. If the amount of manipulation exceeds 10°, the imbalance will be greater, resulting in a larger offset current.

Now, consider a case of delaying switching a phase (rising or falling in each of the rectangular wave voltage waveforms) by 60° in electrical angle in one cycle in response to a torque command. If switching in the U-phase at an electrical angle of 0° is delayed by 60°, an off period thereof having a width of 180+60=240°, with the result that the off period is greatly imbalanced from the next on period having a width of 180°. Similarly, in the case of the V phase, an off period thereof having a width of 240°. Also in the case of the W phase, an on period thereof having a width of 240°.

In such a case, by maintaining the amount of manipulation of the voltage phases at a fixed amount for each electric cycle, the widths of the on and off periods of the voltage can be equal to each other. In other words, when transition from an off state to an on state in each of the phases, i.e., a rise in the waveform is delayed, the fall coming just after the rise is controlled to be also delayed to maintain the on and off widths of the waveform of the switched phase as equal as possible.

The following describes an exemplary case where an amount of change in each of the voltage phases is increased by 10° for every switching occurring in a range of electrical angles from 0° to 300°.

Figure 9:
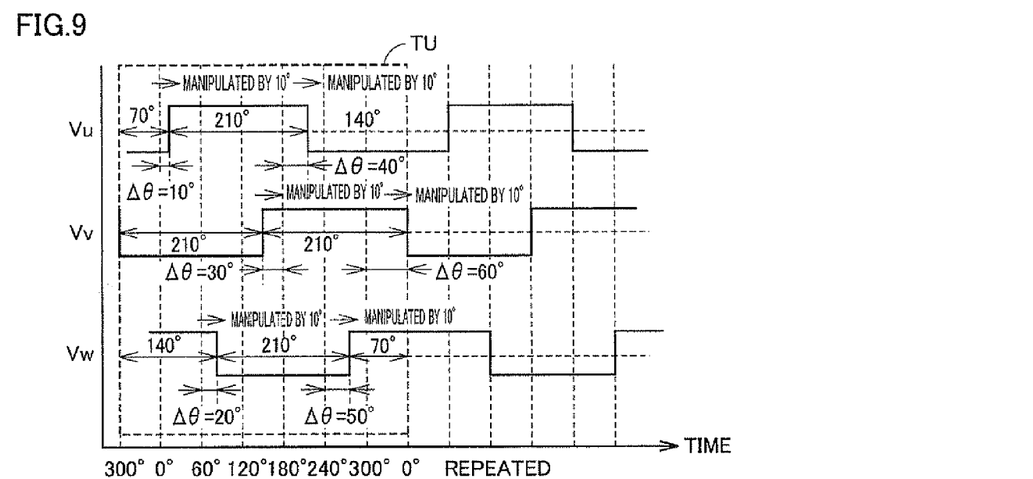
FIG. 9 is a waveform diagram showing one example of changes in voltage phases when the invention of the present application is applied.

FIG. 9 is a waveform diagram showing one example of change in the voltage phases when the invention of the present application is applied.

Referring to FIG. 9, a case where the total amount of change in the voltage phase is 60° is illustrated. In FIG. 9, switching is performed twice in one cycle in each phase. Therefore, switching is performed six times in total. If the amount of change in each phase is zero, switching is performed at six timings corresponding to 0°, 60°, 120°, 180°, 240', and 300° as shown in FIG. 7. Each of these timings will be referred to as a "switching reference phase".

First, at the switching reference phase of 0°, U-phase voltage Vu is delayed by 10°. This causes U-phase voltage Vu to rise from L to H at an electrical angle of 10°.

Next, at a switching reference phase of 60°, the timing of the transition of W-phase voltage Vw is delayed from the reference phase by 20°, which is 10° greater than the previous amount of change, Accordingly, W-phase voltage Vw falls from H to L at an electrical angle of 60+20=80°.

Next, at the switching reference phase of 120', the timing of the transition of V-phase voltage Vv is delayed from the reference phase by 30°, which is 10° greater than the previous amount of change. Accordingly, V-phase voltage Vv rises from L to H at an electrical angle of 120+30=150°.

Next, at the switching reference phase of 180°, the timing of the transition of U-phase voltage Vu is delayed from the reference phase by 40°, which is 10° greater than the previous amount of change. Accordingly, U-phase voltage Vu falls from H to L at an electrical angle of 180+40=220°.

Next, at the switching reference phase of 240°, the timing of the transition of W-phase voltage Vw is delayed from the reference phase by 50°, which is 10° greater than the previous amount of change. Accordingly, W-phase voltage Vw rises from L to H at an electrical angle of 240+50=290°.

Next, at the switching reference phase of 300°, the timing of the transition of V-phase voltage Vv is delayed from the reference phase by 60°, which is 10° greater than the previous amount of change. Accordingly, V-phase voltage Vv falls from H to L at an electrical angle of 300+60=360°.

In the next cycle and subsequent cycles, the transition of each of the phase voltages is delayed by 60° from each of the reference phases to alter the waveforms thereof. In this way, to delay the phases of the voltage waveforms by 60°, the amount of change is gradually increased in one cycle and they are each delayed by 60° in the next and subsequent cycles. This eliminates notable imbalance between the on period and off period in the voltage waveform of each phase, thus preventing occurrence of an offset current.

Specifically, in a period TU surrounded by a broken line in the figure, each of the on periods of the U, V, W-phase voltages continues for 210° whereas each of the off periods thereof continues for 210°. Therefore, it can be seen that no offset current occurs.

Figure 10:
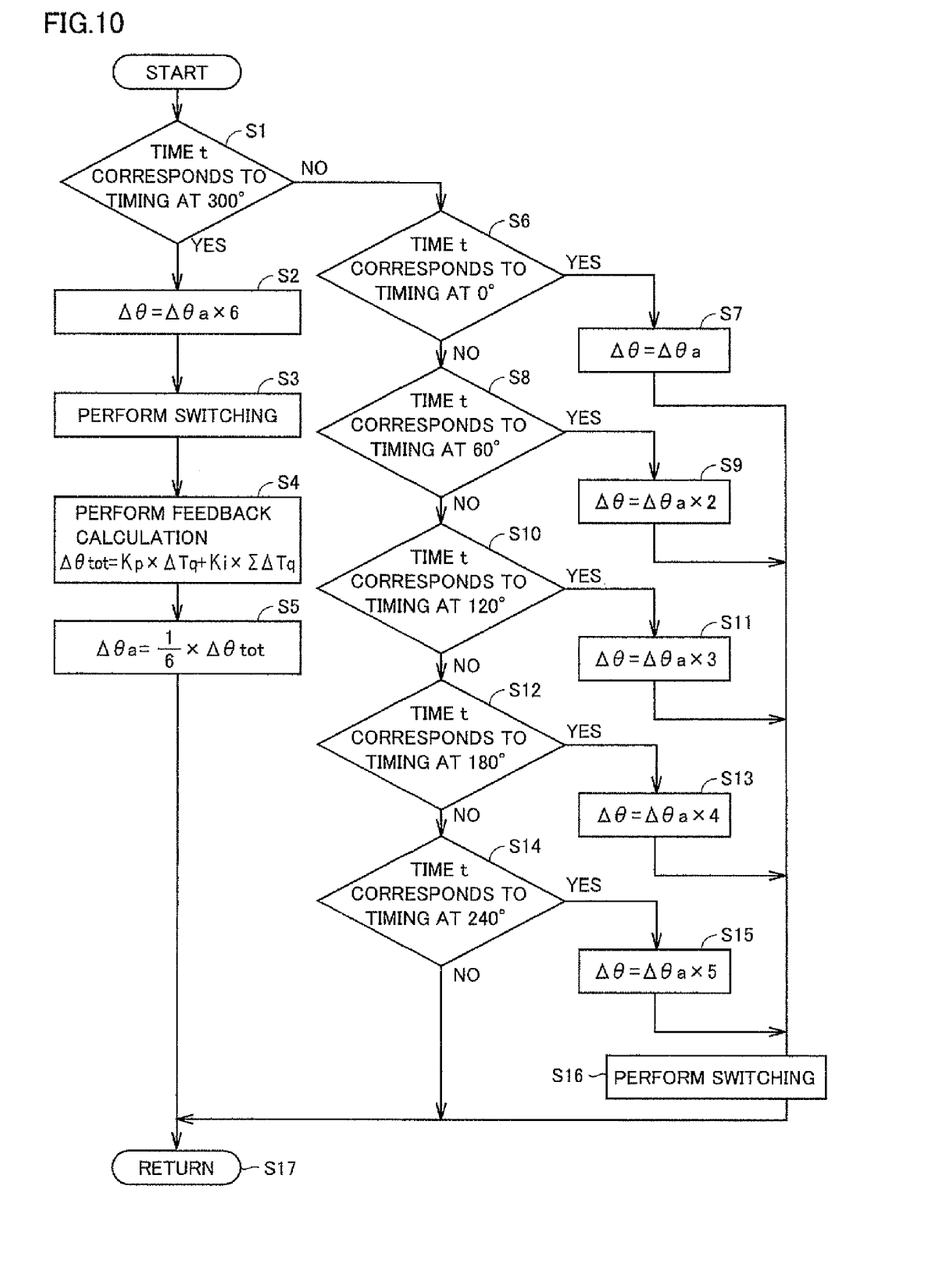
FIG. 10 is a flowchart illustrating control implementing the rectangular wave control shown in FIG. 9.

FIG. 10 is a flowchart illustrating control implementing the rectangular wave control shown in FIG. 9. A process in the flowchart is called from a predetermined main routine and executed whenever a fixed period of time passes or a predetermined condition is satisfied.

The process in the flowchart is performed by control device 30 of FIG. 1 but, in FIG. 6, is executed within a process corresponding to that in the rectangular wave voltage control unit 400.

Referring to FIG. 10, at step S1, the current time is first acquired and it is determined whether or not the time thus acquired corresponds to a timing at 300° in electrical angle, i.e., the last one of the switching reference phases of 0°, 60°, 120°, 180°, 240°, 300° in one cycle. If the determination in step S1 is positive (YES), the process goes to step S2. If the determination in step S1 is negative (NO), the process goes to step S6.

At step S2, a value obtained by multiplying by 6 the value of $\Delta\theta a$ calculated at step S5 in the previous cycle is determined as an amount of change $\Delta\theta$ from the reference phases. Then, at step S3, the phase voltages are switched. In FIG. 9, amount of change $\Delta\theta$ is set to 0° at a timing corresponding to 300° coming before 0° in electrical angle. Hence, at 300°, V-phase voltage Vv falls from the H level to the L level.

Step S3 is followed by a process at step S4. At step S4, a total amount $\Delta\theta tot$ of changing the phases in one cycle is calculated through feedback calculation using the following expression:

$$\Delta\theta tot = Kp \times \Delta Tq + Ki \times \Sigma \Delta Tq \qquad (4)$$

where Kp indicates a proportional gain for proportional integral control (PI control), Ki indicates an integral gain, and Tq indicates a torque. This calculation is performed by the PI calculating unit in FIG. 6.

Step S4 is followed by a process of step S5. At step S5, one sixth of the value of $\Delta\theta tot$ is set as an amount of increase (or decrease) $\Delta\theta a$ of an amount of change of a voltage phase of the rectangular wave voltage of each phase from each of the switching reference phases for the switching performed six times in one cycle. Then, the process goes to step S17, where the control is returned to the main routine.

In the case where the process goes from step S1 to step S6, it is determined at step S6 whether or not time t is at a timing corresponding to the electrical angle of 0°, i.e., the first one of the switching reference phases of 0°, 60°, 120°, 180°, 240°, 300° in one cycle. If the determination at step S6 is positive (YES), the process goes to step S7, where amount of phase change $\Delta\theta$ is set to $\Delta\theta a$ calculated at step S5.

If the determination at step S6 is negative (NO), the process goes to step S8. At step S8, it is determined whether or not time t is at a timing corresponding to the electrical angle of 60°. If the determination at step S8 is positive (YES), the process goes to step S9, where amount of phase change $\Delta\theta$ is set to $\Delta\theta a \times 2$, which is greater by $\Delta\theta a$ than the value set at step S7.

If the determination at step S8 is negative (NO), the process goes to step S10. At step S10, it is determined whether or not time t is at a timing corresponding to the electrical angle of 120°. If the determination at step S10 is positive (YES), the process goes to step S11, where amount of phase change $\Delta\theta$ is set to $\Delta\theta a \times 3$, which is greater by $\Delta\theta a$ than the value set at step S9.

If the determination at step S10 is negative (NO), the process goes to step S12. At step S12, it is determined whether or not time t is at a timing corresponding to the electrical angle of 180°. If the determination at step S12 is positive (YES), the process goes to step S13, where amount of phase change $\Delta\theta$ is set to $\Delta\theta a \times 4$, which is greater by $\Delta\theta a$ than the value set at step S11.

If the determination at step S12 is negative (NO), the process goes to step S14. At step S14, it is determined whether or not time t is at a timing corresponding to the electrical angle of 240°. If the determination at step S14 is positive (YES), the process goes to step S15, where amount of phase change $\Delta\theta$ is set to $\Delta\theta a \times 5$, which is greater by $\Delta\theta a$ than the value set at step S13.

If the determination at step S14 is negative (NO), no switching is performed at the timing of current time t. In this case, the process goes to step S17, where the control is returned to the main routine.

If amount of change $\Delta\theta$ has been set in any one of steps S7, S9, S11, S13, S15, the process goes to step S16, where a corresponding rectangular wave voltage is switched. Thereafter, at step S17, the control is returned to the main routine.

As illustrated in the flowchart of FIG. 10, in one cycle during which switching is performed six times, the amount of change from the reference phases is controlled to increase by $\Delta\theta a$ for each switching and to be fixed at $\Delta\theta tot$ after the cycle has passed. In this way, notable imbalance is eliminated between the on and off periods in the waveform of each phase, thus achieving reduced offset current.

Finally, the embodiment of the present application will be described in summary with reference to each of the figures. Motor driving system 100 shown in FIG. 1 can be used to, for example, drive a wheel of a hybrid vehicle or electric vehicle. The control device of alternating-current motor M1 can be operated as a control device including PWM control unit 200 shown in FIG. 5 and a control device including rectangular wave voltage control unit 400 shown in FIG. 6.

To perform the rectangular wave voltage control shown in FIG. 6, a device for controlling an alternating-current motor includes: a sensor (resolver 25) for detecting a rotational position of an alternating-current motor M1; and a control unit (rectangular wave voltage control unit 400) for performing control based on an output of the sensor (resolver 25) to provide a rectangular wave voltage to each phase of alternating-current motor M1. As shown in FIG. 9, the control unit (rectangular wave voltage control unit 400) causes an amount of change ($\Delta\theta$) in a voltage phase of the rectangular wave voltage of each phase from a switching reference phase (0, 60, 120, 180, 240, 300°) of each phase to increase or decrease such that the amount of change is equivalent at each switching in one cycle (electrical angle 0-360° of electrical angle determined based on the output of the sensor (resolver 25).

This avoids notable imbalance between on and off periods of each rectangular wave.

Preferably, as illustrated in FIG. 10, the control unit (rectangular wave voltage control unit 400) calculates a total amount ($\Delta\theta tot$) of change in the voltage phase of the rectangular wave voltage for each one cycle of electrical angle (step S4 in FIG. 10), and divides the total amount ($\Delta\theta tot$) by the number of times the switching is performed in one cycle, so as to set an amount of increase/decrease ($\Delta\theta a$) of the amount of change ($\Delta\theta$) in the voltage phase of the rectangular wave voltage of each phase (step S5 in FIG. 10).

Accordingly, a targeted voltage phase can be provided eventually while keeping a balance between the on and off periods of each rectangular wave well.

More preferably, the control unit (rectangular wave voltage control unit 400) calculates a total amount ($\Delta\theta tot$) of change in the voltage phase of the rectangular wave voltage based on a torque command (Trqcom) indicating an amount of torque to be generated by the alternating-current motor.

More preferably, the control unit (rectangular wave voltage control unit 400) sets a difference in phase ($\Delta\theta$) at an n-th switching from the switching reference phase of each phase in one cycle, to a value n times larger than the amount of increase/decrease ($\Delta\theta a$). Specifically, at the first switching, $\Delta\theta=\Delta\theta a$ as shown in step S7 of FIG. 10. At the second switching, $\Delta\theta=\Delta\theta a \times 2$ as shown in step S9. At the third switching, $\Delta\theta=\Delta\theta a \times 3$ as shown in step S11. At the fourth switching, $\Delta\theta=\Delta\theta a \times 4$ as shown in step S13. At the fifth switching, $\Delta\theta=\Delta\theta a \times 5$ as shown in step S15. At the sixth switching, $\Delta\theta=\Delta\theta a \times 6$ as shown in step S2.

Further, a method in the present embodiment for controlling an alternating-current motor as illustrated in the flowchart of FIG. 10 includes the steps of: determining (S1, S6, S8, S10, S12, S14) whether to cause transition of a voltage value of a rectangular wave voltage of each phase of an alternating-current motor, based on an output of a sensor (resolver 25) for detecting a rotational position of the alternating-current motor; determining (S2, S7, S9, S11, S13, S15) an amount of increase/decrease of an amount of change of the voltage phase of the rectangular wave voltage of each phase from a switching reference phase of each phase such that the amount of change is equivalent at each switching in one cycle of electrical angle determined based on the output of the sensor; and performing (S3, S16) a switching operation to cause transition of the voltage value of the rectangular wave voltage of each phase, based on the switching reference phase and the amount of change.

Preferably, the method for controlling an alternating-current motor further includes the steps of: calculating (S4) a total amount of change in the voltage phase of the rectangular wave voltage for one cycle of electrical angle; and dividing (S5) the total amount by the number of times the switching is performed in one cycle, so as to set the amount of increase/decrease of the amount of change in the voltage phase of the rectangular wave voltage of each phase.

More preferably, the step of determining (S2, S7, S9, S11, S13, S15) sets a difference in phase at an n-th switching from the switching reference phase of each phase in one cycle, to a value n times larger than the amount of increase/decrease.

It should be considered that the embodiments disclosed herein are illustrative and non-restrictive in any respect. The scope of the present invention is defined by the scope of claims, and is intended to include any modifications within the scope and meaning equivalent to the terms of the claims.

The invention claimed is:

1. A device for controlling an alternating-current motor, comprising:
   a sensor for detecting a rotational position of said alternating-current motor; and
   a control unit for performing control based on an output of said sensor to provide a rectangular wave voltage to each phase of said alternating-current motor,
   said control unit causing an amount of change in a voltage phase of the rectangular wave voltage of said each phase from a switching reference phase of said each phase to increase/decrease such that said amount of change is equivalent at each switching in one cycle of electrical angle determined from the output of said sensor,
   said control unit calculates a total amount of change in the voltage phase of the rectangular wave voltage for each said one cycle of electrical angle, and divides said total amount by the number of times said switching is performed in said one cycle, so as to set an amount of increase/decrease of said amount of change in the voltage phase of the rectangular wave voltage of said each phase,
   said control unit sets a difference in phase at an n-th switching from said switching reference phase of said each phase in said one cycle, to a value n times larger than said amount of increase/decrease, where n is an integer.

2. The device for controlling an alternating-current motor according to claim 1, wherein said control unit calculates said total amount of change in the voltage phase of the rectangular wave voltage based on a torque command indicating an amount of torque to be generated by said alternating-current motor.

3. A method for controlling an alternating-current motor, comprising the steps of:
   determining whether to cause transition of a voltage value of a rectangular wave voltage of each phase of said alternating-current motor, based on an output of a sensor for detecting a rotational position of said alternating-current motor;
   determining an amount of increase/decrease of an amount of change in a voltage phase of the rectangular wave voltage of said each phase from a switching reference phase of said each phase such that said amount of change is equivalent at each switching in one cycle of electrical angle determined from the output of said sensor; and
   performing a switching operation to cause transition of the voltage value of the rectangular wave voltage of said each phase, based on said switching reference phase and said amount of change,
   the step of determining the amount of increase/decrease of the amount of change sets a difference in phase at an n-th switching from said switching reference phase of said each phase in said one cycle, to a value n times larger than an amount of increase/decrease of said amount of change, where n is an integer.

4. The method for controlling an alternating-current motor according to claim 3, further comprising the steps of:
   calculating a total amount of change in the voltage phase of the rectangular wave voltage for said one cycle of electrical angle; and
   dividing said total amount by the number of times said switching is performed in said one cycle, so as to set the amount of increase/decrease of said amount of change in the voltage phase of the rectangular wave voltage of said each phase.

* * * * *